(12) United States Patent
Sokol et al.

(10) Patent No.: US 8,168,153 B2
(45) Date of Patent: May 1, 2012

(54) PROCESS FOR THE PRODUCTION OF CHLORINE DIOXIDE

(75) Inventors: John C. Sokol, Castle Rock, CO (US); Michael Burke, Cumming, GA (US)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 12/668,951

(22) PCT Filed: Jul. 11, 2008

(86) PCT No.: PCT/EP2008/059052
§ 371 (c)(1),
(2), (4) Date: Jan. 13, 2010

(87) PCT Pub. No.: WO2009/010456
PCT Pub. Date: Jan. 22, 2009

(65) Prior Publication Data
US 2010/0189632 A1      Jul. 29, 2010

Related U.S. Application Data

(60) Provisional application No. 60/929,828, filed on Jul. 13, 2007.

(30) Foreign Application Priority Data

Aug. 21, 2007   (EP) ..................... 07114699

(51) Int. Cl.
*C01B 11/02* (2006.01)
(52) U.S. Cl. ......... 423/477; 423/478; 423/479; 423/480
(58) Field of Classification Search .................. 423/477, 423/478, 479, 480
See application file for complete search history.

(56) References Cited

U.S. PATENT DOCUMENTS

| 3,023,076 | A | | 2/1962 | Karwat |
| 3,619,350 | A | * | 11/1971 | Marchfelder ............ 162/67 |
| 4,128,454 | A | * | 12/1978 | Schleinkofer ............ 162/49 |
| 4,129,484 | A | | 12/1978 | Larsson |
| 4,216,195 | A | | 8/1980 | Jaszka et al. |
| 4,534,952 | A | | 8/1985 | Rapson et al. |
| 4,678,653 | A | | 7/1987 | Norell et al. |
| 5,061,471 | A | | 10/1991 | Sundblad et al. |
| 5,091,166 | A | | 2/1992 | Engstrom et al. |
| 5,091,167 | A | | 2/1992 | Engstrom et al. |
| 5,174,868 | A | | 12/1992 | Lipsztajn et al. |

(Continued)

FOREIGN PATENT DOCUMENTS
EP           0 275 246 A2    7/1988
(Continued)

OTHER PUBLICATIONS

English language translation of Laid-Open Patent Gazette No. 88-8203 dated Jan. 14, 1988.

(Continued)

*Primary Examiner* — Ngoc-Yen Nguyen
(74) *Attorney, Agent, or Firm* — Robert C. Morriss

(57) ABSTRACT

The invention concerns a process for the production of chlorine dioxide comprising generating chlorine dioxide in an aqueous reaction medium in a reaction vessel maintained at super-atmospheric pressure, withdrawing gaseous chlorine dioxide from said reaction medium, bringing withdrawn gaseous chlorine dioxide to an aqueous absorption medium and withdrawing gaseous chlorine dioxide from said absorption medium.

16 Claims, 1 Drawing Sheet

U.S. PATENT DOCUMENTS

| | | | |
|---|---|---|---|
| 5,198,080 A | | 3/1993 | Cowley et al. |
| 5,227,031 A | | 7/1993 | Sundblad |
| 5,242,554 A | * | 9/1993 | Kaczur et al. ............... 423/477 |
| 5,366,714 A | | 11/1994 | Bigauskas |
| 5,423,958 A | | 6/1995 | Brannland et al. |
| 5,423,959 A | | 6/1995 | Sundblad et al. |
| 5,478,446 A | | 12/1995 | Falgen et al. |
| 5,487,881 A | | 1/1996 | Falgen et al. |
| 5,565,182 A | * | 10/1996 | Sokol ........................ 423/478 |
| 5,674,466 A | | 10/1997 | Dahl et al. |
| 5,770,171 A | | 6/1998 | Sundblad et al. |
| 5,858,322 A | | 1/1999 | Gray |
| 6,322,690 B1 | | 11/2001 | Hammer-Olsen et al. |
| 6,569,285 B2 | | 5/2003 | Bryant et al. |
| 6,585,950 B1 | | 7/2003 | Dahl et al. |
| 6,752,904 B2 | | 6/2004 | Bryant et al. |
| 7,118,720 B1 | | 10/2006 | Mendelsohn et al. |
| 2003/0031621 A1 | * | 2/2003 | Gravitt et al. ............... 423/477 |

FOREIGN PATENT DOCUMENTS

| | | |
|---|---|---|
| EP | 0 465 447 A1 | 1/1992 |
| EP | 0 612 686 A2 | 8/1994 |
| JP | 63-8203 A | 1/1988 |
| JP | 3-115102 A | 5/1991 |
| WO | WO 01/77012 A1 | 10/2001 |
| WO | WO 2006/033609 A1 | 3/2006 |
| WO | WO 2006/062455 A1 | 6/2006 |
| WO | WO 2007/058936 A1 | 5/2007 |

OTHER PUBLICATIONS

English language translation of Laid-Open Patent Gazette No. 1991-115102A (JP3-115102a) dated May 16, 1991.

International Search Report with a Written Opinion for International Application No. PCT/EP2008/059052 dated Nov. 6, 2008.

Dence, C. W. et al., "Pulp Bleaching—Principles and Practice," Tappi Press 1996, Section II: Raw Materials, Chapter 2: Bleaching Chemicals: Chlorine Dioxide, pp. 61-69.

* cited by examiner

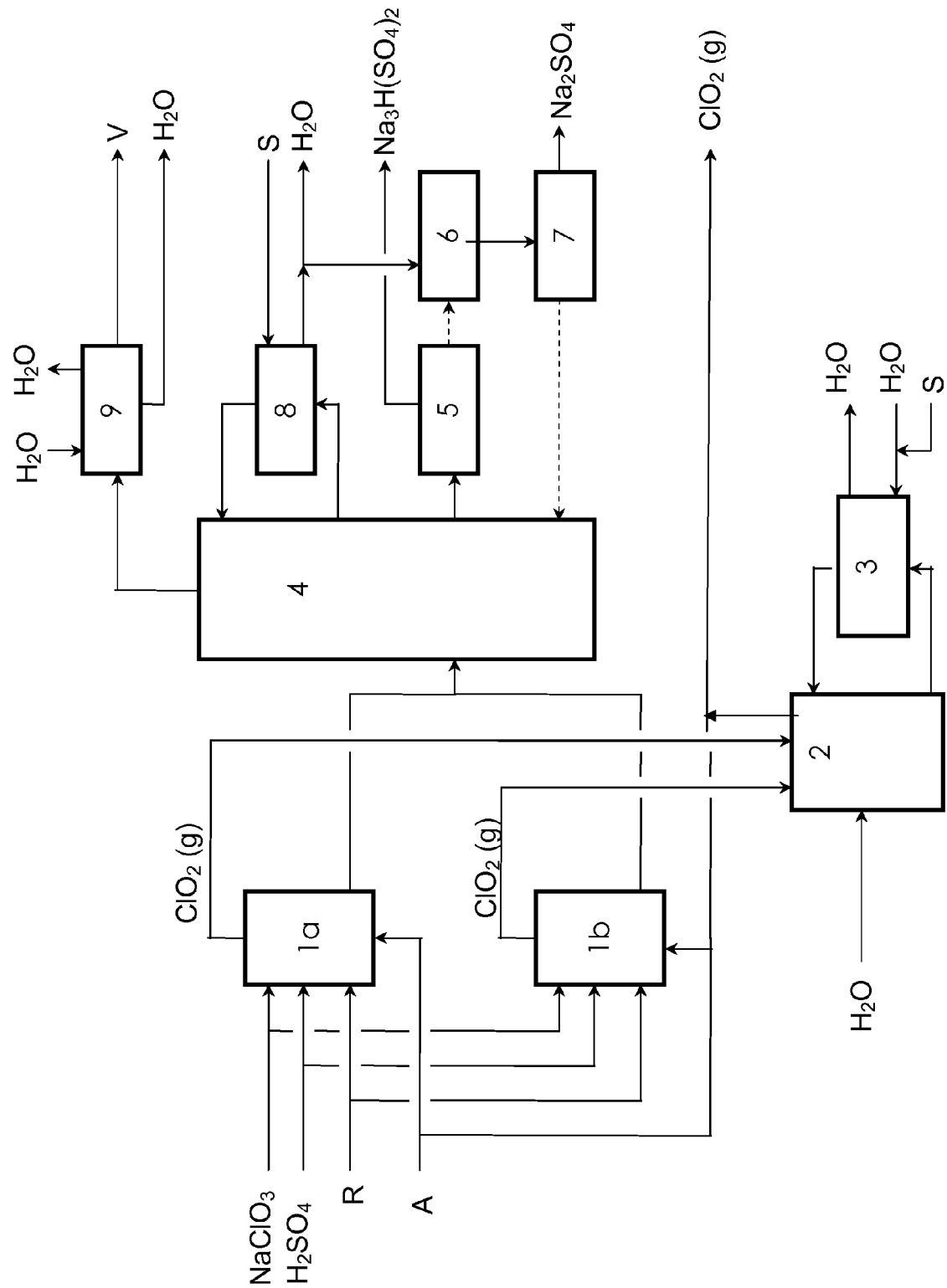

PROCESS FOR THE PRODUCTION OF CHLORINE DIOXIDE

This application is a national stage filing under 35 U.S.C. §371 of PCT/EP2008/059052, filed Jul. 11, 2008, which claims priority to European Patent Application No. 07114699.7, filed Aug. 21, 2007, and U.S. Provisional Patent Application No. 60/929,828, filed on Jul. 13, 2007, the contents of which are incorporated herein by reference in their entirety.

The present invention relates to a process for the production of chlorine dioxide enabling retrieval of gaseous chlorine dioxide.

There are numerous different processes for chlorine dioxide production. Most large scale processes in commercial use are run at pulp mills and involve continuous reaction of alkali metal chlorate in an acidic reaction medium with a reducing agent such as hydrogen peroxide, methanol, chloride ions or sulphur dioxide to form chlorine dioxide that is withdrawn as a gas from the reaction medium and then absorbed in water. An overview of such processes can be found in "Pulp Bleaching—Principles and Practice", TAPPI PRESS 1996, Section II: Raw Materials, Chapter 2: Bleaching Chemicals: Chlorine Dioxide, p. 61-69.

In one series of processes the reaction medium is maintained in a single reaction vessel under boiling conditions at subatmospheric pressure, wherein alkali metal salt of the acid is precipitated and withdrawn as a salt cake. Examples of such processes are described in U.S. Pat. Nos. 5,091,166, 5,091,167, 5,366,714 and 5,770,171, and in WO 2006/062455.

In another series of processes the reaction medium is maintained under non-crystallising conditions, generally at substantially atmospheric pressure. In most cases depleted reaction medium from a first reaction vessel is brought to a second reaction vessel for further reactions to produce chlorine dioxide. Depleted reaction medium withdrawn from the final reaction vessel, usually referred to as residual acid, contains acid, alkali metal salt of the acid and normally some unreacted alkali metal chlorate. Examples of non-crystallising chlorine dioxide generation processes are described in EP 612686, WO 2006/033609, JP 03-115102 and JP 88-008203.

It has also been disclosed to generate chlorine dioxide at super-atmospheric pressure to maintain the chlorine dioxide in aqueous solution, as described in U.S. Pat. Nos. 4,534,952 and 5,061,471, and in EP 275246.

Chlorine dioxide is normally used as an aqueous solution obtained in the production process, particularly in pulp bleaching. It has also been disclosed to use chlorine dioxide in gas phase, for example for removing lignin from wood chips as described in U.S. Pat. Nos. 6,569,285 and 6,752,904, or for treatment of flue gas as described in e.g. U.S. Pat. No. 3,023,076.

However, there is no known process that is attractive for producing chlorine dioxide to be used in gas phase. Due to stability problems it is difficult to store gaseous chlorine dioxide and those processes in which chlorine dioxide is withdrawn from the reaction medium as a gas are difficult to control sufficiently rapidly to meet variations in the demand.

It is an object of the invention to provide a process for the production of chlorine dioxide that is suitable for applications in which gaseous chlorine dioxide is used.

One aspect of the invention concerns a preferably continuous process for the production of chlorine dioxide comprising generating chlorine dioxide in an aqueous reaction medium in a reaction vessel maintained at super-atmospheric pressure, withdrawing gaseous chlorine dioxide from said reaction medium, bringing withdrawn gaseous chlorine dioxide to an aqueous absorption medium and withdrawing gaseous chlorine dioxide from said absorption medium.

The chlorine dioxide is preferably generated by reducing chlorate ions, for example electrochemically or by means of a chemical reducing agent. Any known reducing agent may be used alone or in mixtures, such as at least one of chloride ions, sulphur dioxide, methanol and hydrogen peroxide, of which hydrogen peroxide, alone or in mixture with one or more other reducing agents, is particularly preferred.

The aqueous reaction medium in the reaction vessel is preferably acidic, for example having an acidity from about 0.5 to about 14 N or from about 4 to about 12 N. The acidity may be provided by feeding any suitable acid, preferably a mineral acid. Examples of acids include sulphuric acid, hydrochloric acid, phosphoric acid and chloric acid, of which sulfuric acid is particularly preferred.

The concentration of chlorate in the reaction medium in the reaction vessel is preferably below saturation and may, for example, be from about 0.05 moles/l to saturation, or from about 1 to about 3.5 moles/l. The chlorate may be supplied as alkali metal chlorate like sodium chlorate, as chloric acid, or any mixture thereof. The optimal acidity and chlorate concentration depends on the reducing agent used and other circumstances in each individual set up.

The aqueous reaction medium in the reaction vessel is preferably maintained at a temperature below the boiling point at the prevailing pressure. In most cases, a preferred temperature is from about 35 to about 100° C., or from about 65 to about 85° C. The absolute pressure is preferably from about 105 to about 230 kPa, or from about 120 to about 210 kPa, or from about 125 to about 195 kPa.

Preferably inert gas is blown through the reaction vessel to increase the agitation and dilute the chlorine dioxide to a safe concentration. The inert gas also contributes in stripping off chlorine dioxide from the reaction medium. Any available inert gas such as nitrogen or oxygen can be used, but for cost reasons it is usually preferred to use air.

The aqueous reaction medium in the reaction vessel is preferably maintained under non-crystallising conditions. Depleted reaction medium may be withdrawn and used for e.g. pH control or the like, or be disposed of.

In an embodiment where alkali metal chlorate and an acid are fed to the reaction medium, depleted reaction medium may be withdrawn from the reaction vessel and brought to a crystalliser in which alkali metal salt of the acid is precipitated and withdrawn as a solid salt cake, while the liquid phase may be recirculated to the reaction vessel. The crystallisation is preferably performed at subatmospheric pressure and most preferably under boiling conditions. The pressure may, for example, be from about 10 to about 100 kPa or from about 20 to about 80 kPa. In the case of sodium chlorate and sulphuric acid being used for the chlorine dioxide generation, the liquid in the crystalliser may, for example, contain from about 400 to about 550 g/l sulphuric acid, from about 200 to about 300 g/l sodium chlorate and from about 15 to about 35 wt % solids, mainly in the form of sodium sesqui sulphate. The salt cake may be used for various applications or simply be disposed of. If the salt cake is acidic, such as sodium hydrogen sulphate or sodium sesqui sulphate, it may be partly or fully neutralised by treatment with water or another solvent, as described in e.g. U.S. Pat. Nos. 5,674,466 and 6,585,950. It is also possible to dissolve the salt cake in water and treat it electrochemically to produce the acid of the salt and optionally recirculate the acid to the reaction vessel.

In another embodiment depleted reaction medium withdrawn from the reaction vessel can be treated electrochemically to increase its acidity without prior crystallisation, and then optionally be recirculated to the reaction vessel.

Electrochemical treatment of depleted reaction medium or of dissolved salt cake can be done in any known way, for example as described in U.S. Pat. Nos. 4,129,484, 5,174,868, 5,198,080, 5,227,031, 5,423,959, 5,423,958, U.S. Pat. No. 5,478,446, U.S. Pat. Nos. 5,487,881, and 6,322,690.

In an embodiment depleted reaction medium withdrawn from the reaction vessel is brought to one or more further reaction vessels where remaining chlorate is reacted with added reducing agent to generate chlorine dioxide. The depleted reaction medium from the final reaction vessel may used for e.g. pH control or the like, be disposed of, or be treated in accordance of any of the embodiments described above.

Before disposal or any other use or treatment, depleted reaction medium withdrawn from a reaction vessel may be stripped with inert gas such as air to remove chlorine dioxide and other gaseous components therefrom.

Gaseous chlorine dioxide is withdrawn from the reaction medium together with any added inert gas and other gaseous components formed, such as oxygen in case hydrogen peroxide is used as reducing agent. The concentration of chlorine dioxide in the withdrawn gas is preferably from about 5 to about 25% v/v, or from about 10 to about 20% v/v.

The gaseous chlorine dioxide withdrawn from the reaction medium is brought to an aqueous absorption medium, preferably being substantially saturated in respect of chlorine dioxide at the prevailing conditions. At the same time as chlorine dioxide from the reaction vessel is absorbed, gaseous chlorine dioxide departs from the absorption medium together with other gaseous components from the reaction vessel. The rate of which the chlorine dioxide departs can be controlled by altering its solubility, for example by changing the temperature of the absorption medium or by blowing inert gas such as air through the absorption medium to shift the equilibrium between the liquid and gaseous phases. The gas departed from the absorption medium may then be further diluted to a concentration suitable for its intended use, such as flue gas treatment as described in e.g. U.S. Pat. Nos. 3,023,076 and 7,118,720, and in WO 2007/058936.

The chlorine dioxide concentration in the aqueous absorption medium is preferably from about 5 to about 18 g/l or from about 8 to about 12 g/l. The temperature is preferably from about 0 to about 35° C. or from about 5 to about 25° C.

The aqueous absorption medium is preferably maintained in vessel such as a tank, the liquid level of which preferably substantially corresponding to the pressure in the reaction vessel. Thus, the pressure can be increased by increasing the liquid level of the absorption medium in the vessel, and vice versa. A preferred liquid level may, for example, be from about 0.5 to about 15 m, or from about 5 to about 10 m. This arrangement provides a very reliable pressure control system facilitating stable operation of the process and decreasing the risk for chlorine dioxide decomposition. However, it is also possible to control the pressure by any other appropriate means, such as pressure restrictions in the gas discharge line like orifice plates, venturi type pressure reducers, control valves or other pressure reduction devices. It is also possible to employ a combination of a pressure reduction device such as a venturi followed in series by a liquid tank as described above.

In case of interruption of the chlorine dioxide generation, the demand for gaseous chlorine dioxide may still be satisfied for some time by blowing inert gas through the absorption medium and thereby stripping off chlorine dioxide.

In an embodiment of the invention two or more reaction vessels for the generation of chlorine dioxide are operated in parallel but with a common vessel for the aqueous absorption medium. In case depleted reaction medium is brought to a crystalliser, this may also be a common unit serving two or more reaction vessels.

An embodiment of the invention will now be described in connection with the appended FIGURE showing a schematic flow diagram thereof. The invention is, however, not limited to the embodiment shown.

Referring to the FIGURE, two reaction vessels $1a$, $1b$ operating in parallel, each holding an aqueous reaction medium, are continuously supplied with $NaClO_3$, $H_2SO_4$ (or another acid) a reducing agent R such as $H_2O_2$ or MeOH and a stream of air A as inert gas. Generated chlorine dioxide $ClO_2$ (g) is withdrawn in a gas stream together with the supplied air and other gaseous components and is injected into an aqueous absorption medium maintained in a common tank 2. The temperature, and thereby the solubility of the chlorine dioxide, is controlled by circulating the absorption medium through a heat exchanger 3 provided with steam S or cold water. The tank 2 may also be provided with make-up water to compensate for water departing with the chlorine dioxide. The absorption medium in the tank 2 is saturated in respect of chlorine dioxide, so simultaneously with injection of chlorine dioxide from the reaction vessels $1a$, $1b$, gas containing chlorine dioxide departs from the tank and is then further diluted with air A to a concentration suitable for the intended use. If there is an interruption in the generation of chlorine dioxide in one or more of the reaction vessels $1a$, $1b$, the air flow A through the reaction vessel may be continued to strip off chlorine dioxide from the reaction medium and further through the absorption medium to strip off chlorine dioxide therefrom.

Depleted reaction medium is withdrawn from the reaction vessels $1a$, $1b$, and after optional stripping or other treatment (not shown), it is brought to a common evaporator/crystalliser 4 operating under boiling conditions at subatmospheric pressure. Solid sodium sesqui-sulphate crystallises and is withdrawn by means of a filter 5. Optionally the sodium sesqui-sulphate may be fully or partly neutralised by treatment with water in a metathesis tank 6 and then separated by means of a second filter 7, while the liquid phase may be returned to the evaporator/crystalliser. Heat is supplied via a reboiler 8 fed with steam S. Evaporated water and other gaseous components are brought to a condenser 9 separating the water from non-condensable gas withdrawn in a vent V.

As an example of operating conditions when producing chlorine dioxide from sodium chlorate, sulphuric acid and hydrogen peroxide at a pressure of 160 kPa, the aqueous reaction medium in each reaction vessel $1a$, $1b$ may contain about 150 g/l $NaClO_3$ and about 340 g/l $H_2SO_4$, while the gas leaving the reaction vessel may contain about 15% v/v of $ClO_2$. The aqueous absorption medium in the tank 2 may then have a temperature of about 16° C. and contain about 10 g/l $ClO_2$. The evaporator/crystalliser 4 may operate at a pressure of about 53 kPa and containing about 500 g/l $H_2SO_4$, 250 g/l $NaClO_3$ and about 25 wt % solids (mainly $Na_3H(SO_4)_2$).

EXAMPLE

Chlorine dioxide was produced in a laboratory reactor fed with sodium chlorate, sulphuric acid and hydrogen peroxide, and with an air flow blowing through the reaction medium. The reactor contained about 2 $dm^3$ aqueous reaction medium containing about 400 $g/dm^3$ $H_2SO_4$, 25 $g/dm^3$ $NaClO_3$ and 350 $g/dm^3$ $Na_2SO_4$. The temperature was maintained at about 58° C. and the production rate of chlorine dioxide was about 1 kg $ClO_2/dm^3$, 24 h. Gas comprising chlorine dioxide was withdrawn from the reactor and bubbled via a glass frit into an absorption vessel holding an aqueous absorption medium saturated in respect of chlorine dioxide, and from which gas comprising chlorine simultaneously departed. The results of eight runs under various steady state conditions are shown in the table below:

| Exp. No. | Pressure [bar] | Water temp in absorption vessel [° C.] | $ClO_2$ in absorption vessel [g/dm³] | $ClO_2$ in gas departed from absorption vessel [vol-%] |
|---|---|---|---|---|
| 1 | 1.2 | 26.9 | 6.5 | 10.0 |
| 2 | 1.6 | 10.3 | 22.2 | 9.3 |
| 3 | 1.2 | 9.7 | 23.1 | 14.8 |
| 4 | 1.6 | 26.4 | 14.6 | 13.7 |
| 5 | 1.4 | 18.7 | 14.9 | 12.3 |
| 6 | 1.4 | 18.2 | 15.6 | 12.1 |
| 7 | 1.4 | 18.1 | 15.0 | 12.2 |
| 8[1)] | 1.4 | 18.6 | 16.8 | 13.0 |

[1)]No glass frit in the absorption vessel.

The invention claimed is:

1. A process for the production of chlorine dioxide comprising generating chlorine dioxide in an aqueous reaction medium in a reaction vessel maintained at super-atmospheric pressure, withdrawing gaseous chlorine dioxide from said reaction medium, bringing withdrawn gaseous chlorine dioxide to an aqueous absorption medium and withdrawing gaseous chlorine dioxide from said absorption medium, and wherein at the same time as chlorine dioxide from the reaction vessel is absorbed, gaseous chlorine dioxide departs from the absorption medium.

2. The process as claimed in claim 1, wherein the chlorine dioxide is generated by reducing chlorate ions by means of a chemical reducing agent.

3. The process as claimed in claim 2, wherein the chemical reducing agent is at least one of chloride ions, sulphur dioxide, methanol and hydrogen peroxide.

4. The process as claimed in claim 3, wherein the chemical reducing agent is hydrogen peroxide, alone or in mixture with one or more other reducing agents.

5. The process as claimed in claim 1, wherein inert gas is blown through the reaction vessel.

6. The process as claimed in claim 1, wherein aqueous reaction medium in the reaction vessel is maintained at an absolute pressure from about 105 to about 230 kPa.

7. The process as claimed in claim 1, wherein the aqueous reaction medium in the reaction vessel is maintained at a temperature below the boiling point at the prevailing pressure.

8. The process as claimed in claim 7, wherein the aqueous reaction medium in the reaction vessel is maintained at a temperature from about 35 to about 100° C.

9. The process as claimed in claim 8, wherein the aqueous reaction medium in the reaction vessel is maintained at a temperature from about 65 to about 85° C.

10. The process as claimed in claim 1, wherein the reaction medium in the reaction vessel is maintained under non-crystallizing conditions.

11. The process as claimed in claim 1, wherein the aqueous absorption medium is maintained in a vessel.

12. The process as claimed in claim 11, wherein the liquid level of the aqueous absorption medium in the vessel substantially corresponds to the pressure in the reaction vessel.

13. The process as claimed in claim 1, wherein the temperature of the aqueous absorption medium is from about 0 to about 35° C.

14. The process as claimed in claim 1, wherein inert gas is blown through the aqueous absorption medium.

15. A process for the production of chlorine dioxide comprising generating chlorine dioxide in an aqueous reaction medium in a reaction vessel maintained at super-atmospheric pressure and at a temperature below the boiling point at the prevailing pressure, blowing inert gas through the reaction vessel, withdrawing gaseous chlorine dioxide from said reaction medium, bringing withdrawn gaseous chlorine dioxide to an aqueous absorption medium and withdrawing gaseous chlorine dioxide from said absorption medium, and wherein at the same time as chlorine dioxide from the reaction vessel is absorbed, gaseous chlorine dioxide departs from the absorption medium.

16. The process of claim 15, wherein the aqueous absorption medium is maintained in a vessel in which the liquid level of the absorption medium substantially corresponds to the pressure in the reaction vessel.

\* \* \* \* \*